United States Patent
Iwasa et al.

(10) Patent No.: US 8,050,014 B2
(45) Date of Patent: Nov. 1, 2011

(54) SOLID ELECTROLYTIC CAPACITOR AND METHOD FOR PRODUCTION THEREOF

(75) Inventors: Tetsuro Iwasa, Osaka (JP); Hiroshi Nakajima, Osaka (JP); Seiji Omura, Hyogo (JP)

(73) Assignee: Sanyo Electric Co., Ltd., Moriguchi-shi, Osaka ( * ) Notice: Subject to any disclaimer, the term of this patent is extended or adjusted under 35 U.S.C. 154(b) by 695 days.

(21) Appl. No.: 12/027,537

(22) Filed: Feb. 7, 2008

(65) Prior Publication Data
US 2008/0204975 A1    Aug. 28, 2008

(30) Foreign Application Priority Data

Feb. 28, 2007 (JP) ................................ 2007-050442
Mar. 22, 2007 (JP) ................................ 2007-074270

(51) Int. Cl.
*H01G 9/00* (2006.01)

(52) U.S. Cl. ........ 361/523; 361/516; 361/519; 361/525; 361/528; 361/529

(58) Field of Classification Search .......... 361/516–519, 361/525–529, 530, 540–541, 520–523; 29/25.01, 29/25.03
See application file for complete search history.

(56) References Cited

U.S. PATENT DOCUMENTS

| | | | |
|---|---|---|---|
| 5,473,503 A | 12/1995 | Sakata et al. | |
| 6,361,572 B1 * | 3/2002 | Igaki et al. | 29/25.03 |
| 6,663,796 B1 * | 12/2003 | Ohata et al. | 252/500 |
| 6,674,635 B1 * | 1/2004 | Fife et al. | 361/523 |
| 6,906,912 B2 * | 6/2005 | Arai et al. | 361/525 |
| 7,218,506 B2 * | 5/2007 | Kobayashi et al. | 361/523 |
| 7,460,358 B2 * | 12/2008 | Biler | 361/523 |
| 7,495,890 B2 * | 2/2009 | Chacko | 361/523 |
| 7,691,533 B2 * | 4/2010 | Sano et al. | 429/213 |

FOREIGN PATENT DOCUMENTS

| | | |
|---|---|---|
| JP | 07-094368 | 4/1995 |
| JP | 11-045824 | 2/1999 |
| JP | 2000-133549 | 5/2000 |
| KR | 1020010015430 A | 2/2001 |
| KR | 1020020009965 A | 2/2002 |
| KR | 1020030032252 A | 4/2003 |

OTHER PUBLICATIONS

Korean Office Action Mailed Oct. 20, 2010 for Korean Patent Application No. 10-2007-0117881.
Chinese Office Action Issued Jan. 30, 2011 for Application No. 200710196997.2.
Japanese Office Action for Japanese Patent Application Ser. No. 2007-074270 mailed on May 24, 2011.
Japanese Office Action for Japanese Patent Application Ser. No. 2007-050442 mailed on Mar. 22, 2011.

* cited by examiner

*Primary Examiner* — Nguyen Ha

(74) *Attorney, Agent, or Firm* — Turocy & Watson, LLP

(57) ABSTRACT

A solid electrolytic capacitor having a solid electrolyte layer, comprising: the solid electrolyte layer having an electrically-conductive polymer hybrid layer containing an electrolytically-polymerized electrically-conductive polymer and a chemically-polymerized electrically-conductive polymer.

5 Claims, 5 Drawing Sheets

1 : ANODE BODY
2 : DIELECTRIC FILM
3 : SOLID ELECTROLYTE LAYER
4 : CARBON LAYER(FIRST CATHODE LEAD LAYER)
5 : SILVER PASTE LAYER(SECOND CATHODE LEAD LAYER)
7 : EXTERIOR COATING RESIN
8 : CAPACITOR ELEMENT
10 : ANODE LEAD
20 : ANODE LEAD FRAME
21 : CATHODE LEAD FRAME
30 : ELECTRICALLY-CONDUCTIVE PRECOAT LAYER
32 : ELECTRICALLY-CONDUCTIVE POLYMER HYBRID LAYER

1 : ANODE BODY
2 : DIELECTRIC FILM
3 : SOLID ELECTROLYTE LAYER
4 : CARBON LAYER(FIRST CATHODE LEAD LAYER)
5 : SILVER PASTE LAYER(SECOND CATHODE LEAD LAYER)
7 : EXTERIOR COATING RESIN
8 : CAPACITOR ELEMENT
10 : ANODE LEAD
20 : ANODE LEAD FRAME
21 : CATHODE LEAD FRAME
30 : ELECTRICALLY-CONDUCTIVE PRECOAT LAYER
32 : ELECTRICALLY-CONDUCTIVE POLYMER HYBRID LAYER

SOLID ELECTROLYTIC CAPACITOR AND METHOD FOR PRODUCTION THEREOF

BACKGROUND OF THE INVENTION

1. Field of the Invention

The invention relates to a solid electrolytic capacitor having an electrically-conductive polymer as a solid electrolyte and a method for production thereof.

2. Description of the Related Art

In accordance with recent trend in reducing the size and weight of electronic equipment, there are increasing demands for a compact capacitor having large capacitance and exhibiting low impedance in a high frequency range. Therefore, the solid electrolytic capacitor having an electrically-conductive polymer as a solid electrolyte is further demanded reduction of ESR(Equivalent Series Resistance) as characteristic improvement in the high frequency range. Herein, examples of the electrically-conductive polymer include polymers produced by polymerizing a monomer such as pyrrole, thiophene, furan, or aniline.

Known methods for producing electrically-conductive polymer include the chemical polymerization method and the electrolytic polymerization method. In general, as compared with the chemical polymerization method, the electrolytic polymerization method can produce an electrically-conductive polymer film excellent in mechanical strength and electrical conductivity. However, when the electrically-conductive polymer produced by electrolytic polymerization is used to form a solid electrolyte layer, the surface of the solid electrolyte layer tends to be smooth, and adhesion between the solid electrolyte layer and a cathode lead layer formed thereon becomes poor, so that ESR can increase in the high frequency range.

On the other hand, known methods for reducing ESR include improving the adhesion between a solid electrolyte layer and a cathode lead layer. Known examples of such methods include a technique that includes enhancing the adhesion between a cathode lead layer and a solid electrolyte layer by depositing, on a capacitor element, an electrically-conductive powder for forming irregularities on the surface of the solid electrolyte layer (for example, Japanese Patent Application Laid-Open (JP-A) No. H07-94368) and a technique that includes forming an electrically-conductive polymer film by a chemical polymerization on an electrically-conductive polymer film formed by an electrolytic polymerization in the process of preparing a solid electrolyte layer so that good adhesion between the cathode lead layer and the solid electrolyte layer is provided (for example, Japanese Patent Application Laid-Open (JP-A) No. 2000-133549).

However, the former technique (JP-A No. H07-94368) has a problem in which the number of the processes for depositing the electrically-conductive powder on the element increases, and the electrically-conductive powder makes a solid electrolyte layer thick so that the thickness of the capacitor increases. The latter technique (JP-A No. 2000-133549) also has a problem in which since the formation of the electrically-conductive polymer film by the electrolytic polymerization is followed by the formation of the electrically-conductive polymer film by the chemical polymerization, the number of processes increases, and the production of the capacitor is not easy.

SUMMARY OF THE INVENTION

In light of the above problems, an object of the invention is to provide a solid electrolytic capacitor in which a solid electrolyte layer is formed with good adhesion to a cathode lead layer and which is compact and has good ESR characteristics and can be easily produced, and to provide a method for production thereof.

According to a first aspect of the invention, there is provided a solid electrolytic capacitor having a solid electrolyte layer, comprising:

the solid electrolyte layer having an electrically-conductive polymer hybrid layer containing an electrolytically-polymerized electrically-conductive polymer and a chemically-polymerized electrically-conductive polymer.

According to a second aspect of the invention, there is provided a method for producing a solid electrolytic capacitor having a solid electrolyte layer, wherein the solid electrolyte layer includes an electrically-conductive polymer hybrid layer containing an electrolytically-polymerized electrically-conductive polymer and a chemically-polymerized electrically-conductive polymer, comprising the step of:

forming the electrically-conductive polymer hybrid layer by an electrolytic polymerization in an electrolytic polymerization solution containing an electrolytically-oxidizable metal ion and/or an electrolytically-oxidizable metal oxide ion and a chemical polymerization using an oxidizing agent produced by electrolytic oxidation of the metal ion and/or the metal oxide ion in the electrolytic polymerization solution.

According to a third aspect of the invention, there is provided a method for producing a solid electrolytic capacitor having a solid electrolyte layer, wherein the solid electrolyte layer includes an electrolytically-polymerized electrically-conductive polymer layer containing an electrolytically-polymerized electrically-conductive polymer, and an electrically-conductive polymer hybrid layer containing an electrolytically-polymerized electrically-conductive polymer and a chemically-polymerized electrically-conductive polymer, comprising the steps of:

forming the electrically-polymerized electrically-conductive layer by an electrolytic polymerization in an electrolytic polymerization solution containing at least a monomer and a dopant;

adding a metal compound that produces an electrolytically-oxidizable metal ion and/or an electrolytically-oxidizable metal oxide ion to the electrolytic polymerization solution; and forming the electrically-conductive polymer hybrid layer by an electrolytic polymerization in the electrolytic polymerization solution containing the metal ion and/or the metal oxide ion and a chemical polymerization using an oxidizing agent produced by electrolytic oxidation of the metal ion and/or the metal oxide ion in the electrolytic polymerization solution.

Other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE PREFERRED EMBODIMENTS

The best mode for carrying out the invention is described below.

First Embodiment

Figure 1:
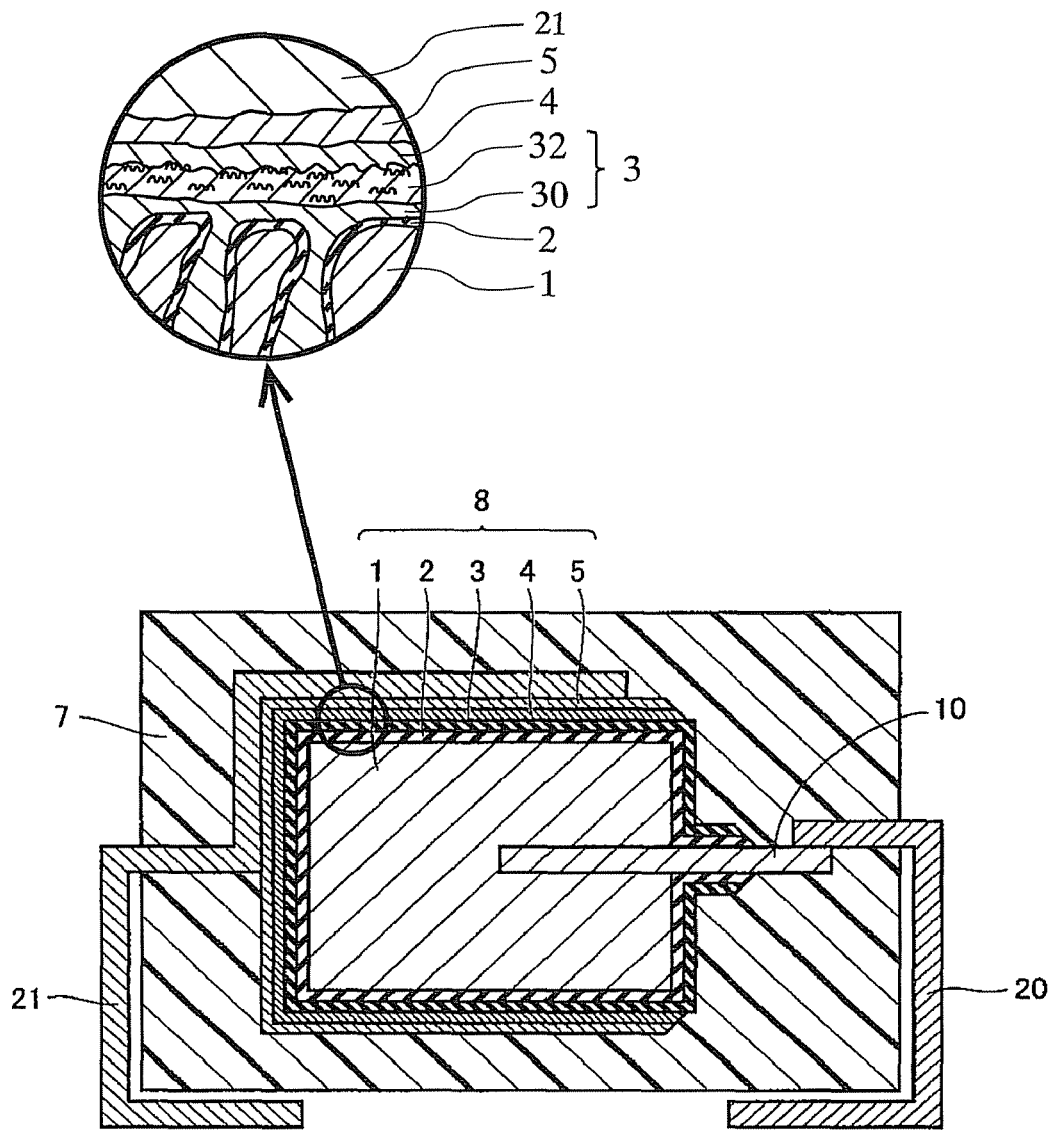
FIG. 1 is a cross-sectional schematic view showing the structure of a solid electrolytic capacitor according to a first embodiment of the invention.

Referring to FIG. 1, a solid electrolytic capacitor of a first embodiment has a capacitor element 8 including an anode body 1 made of a valve metal and having an anode lead 10, and a dielectric film 2, a solid electrolyte layer 3, a first cathode lead layer 4, and a second cathode lead layer 5 that are sequentially formed on the anode body 1. An anode lead frame 20 is connected to the anode lead 10, and a cathode lead frame 21 is connected to the second cathode lead layer 5. An exterior coating resin 7 is formed around the capacitor element 8 such that an end portion of each of the anode lead frame 20 and the cathode lead frame 21 is exposed to the outside. The solid electrolytic capacitor according to the first embodiment has the above configuration. Alternatively, the cathode lead layer formed on the solid electrolyte layer 3 may be a single layer structure in place of the laminate structure of the first and second cathode lead layers 4 and 5.

The solid electrolyte layer 3 includes an electrically-conductive polymer hybrid layer 32 containing an electrolytically-polymerized electrically-conductive polymer and a chemically-polymerized electrically-conductive polymer. Specifically, the solid electrolyte layer 3 is composed of an electrically-conductive precoat layer 30, which is formed on the dielectric film 2, and the electrically-conductive polymer hybrid layer 32, which is formed on the electrically-conductive precoat layer 30 and in contact with the first cathode lead layer 4. Examples of the electrically-conductive polymer include polymers produced by polymerizing monomers such as heterocyclic compound (pyrrole, thiophene, furan, etc), aromatic compound (aniline, etc), and derivatives thereof. The electrolytically-polymerized electrically-conductive polymer refers to an electrically-conductive polymer produced by an electrolytic polymerization. The chemically-polymerized electrically-conductive polymer refers to an electrically-conductive polymer produced by a chemical polymerization.

The electrically-conductive polymer hybrid layer 32 is formed by causing a chemical polymerization together with an electrolytic polymerization and whereby the electrically-conductive polymer hybrid layer 32 has a structure in which a chemically-polymerized electrically-conductive polymer is blended in an electrolytically-polymerized electrically-conductive polymer. Thus, the surface of the electrically-conductive polymer hybrid layer 32 has fine irregularities as compared with the surface of the electrolytically-polymerized electrically-conductive polymer film.

Various materials may be used for each of the anode body 1, the dielectric film 2, the first cathode lead layer 4, and the second cathode lead layer 5, similarly to known solid electrolytic capacitors.

Following is a description of a method for producing the solid electrolytic capacitor of the first embodiment.

First, the anode body 1 made of a valve metal is anodically oxidized so that the dielectric film 2 is formed on the surface of the anode body 1. Thereafter, the electrically-conductive precoat layer 30, such as a chemically polymerized layer formed by a chemical polymerization of a monomer or a manganese dioxide layer formed by thermal decomposition, is formed on the surface of the dielectric film 2.

The electrically-conductive polymer hybrid layer 32 containing an electrolytically-polymerized electrically-conductive polymer and a chemically-polymerized electrically-conductive polymer is then formed on the surface of the electrically-conductive precoat layer 30. The electrically-conductive polymer hybrid layer 32 is formed by the method described below. First, a small amount of an electrolytically-oxidizable metal ion and/or an electrolytically-oxidizable metal oxide ion is previously added to a solution containing at least a monomer for forming an electrically-conductive polymer and a supporting electrolyte so that an electrolytic polymerization solution is prepared. As shown in the upper part of FIG. 2, an anode body element 1A having the electrically-conductive precoat layer 30 is then immersed in the electrolytic polymerization solution. An anode rod is brought into contact with part of the anode body element 1A from the outside, or an electrode for an electrolytic polymerization is connected to the anode lead 10. Then, an electric current is passed between the anode body element 1A and a cathode plate placed in the electrolytic polymerization solution to start a polymerization reaction, so that the electrically-conductive polymer hybrid layer 32 is formed.

Figure 2:
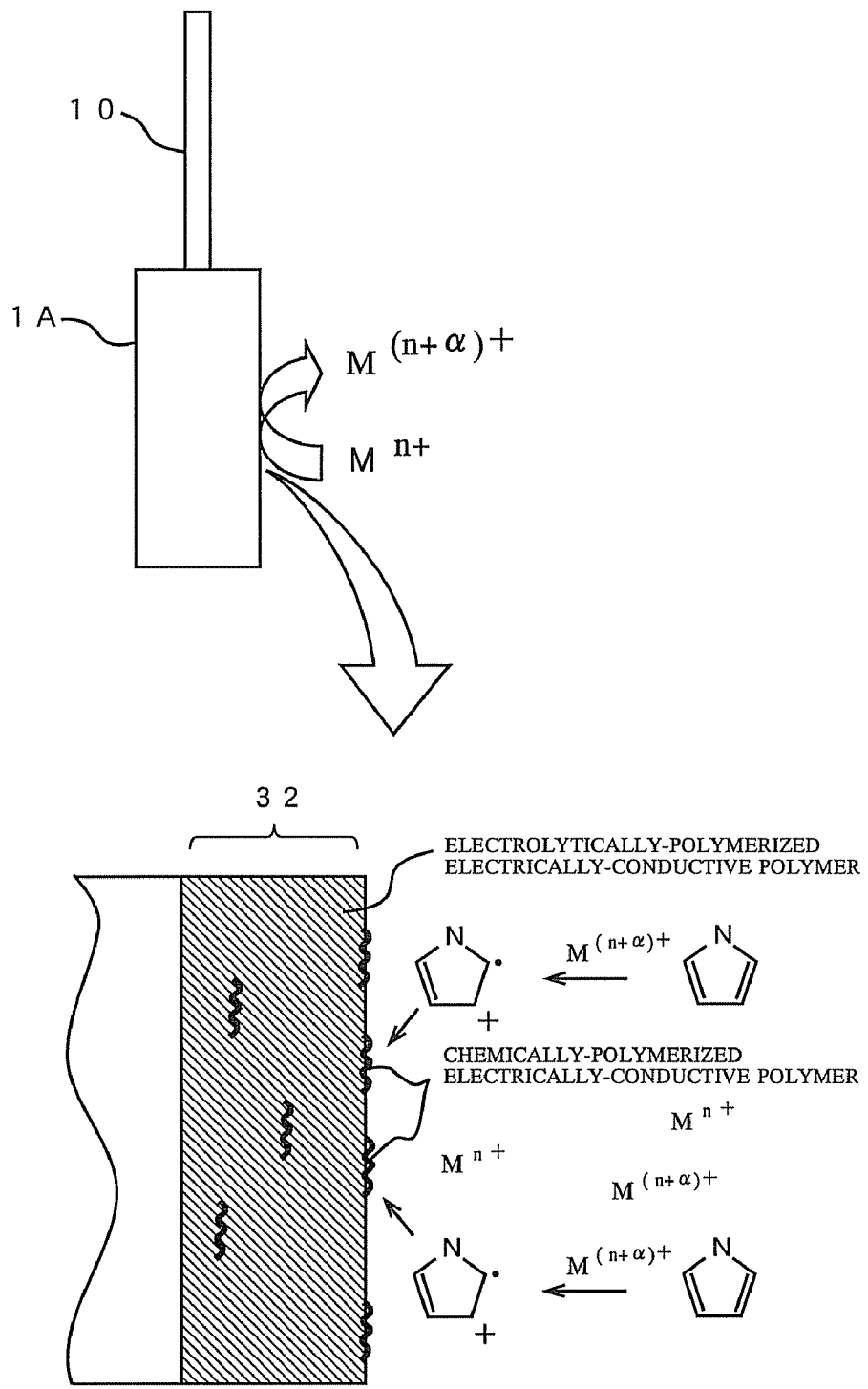
FIG. 2 is a schematic diagram showing the process of forming an electrically-conductive polymer hybrid layer in methods for producing solid electrolytic capacitors according to first and second embodiments of the invention.

Specifically, as shown in the lower part of FIG. 2, the polymerization takes place not only an electrolytic polymerization using the anode body element 1A as an anode but also electrolytic oxidation of the electrolytically-oxidizable metal ion and/or the electrolytically-oxidizable metal oxide ion $M^{n+}$ into high-valence ion $M^{(n+\alpha)+}$ on or near the surface of the anode (including the anode body element 1A and a polymer film being formed on the anode body element 1A by the polymerization). The high-valence metal ion and/or the high-valence metal oxide ion $M^{(n+\alpha)+}$ act as an oxidizing agent to oxidize the monomer in the vicinity thereof so that the monomer is polymerized chemically. Also, by the chemical polymerization, the high-valence metal ion and/or the high-valence metal oxide ion $M^{(n+\alpha)+}$ functioning as an oxidizing agent are reduced into the low-valence electrolytically-oxidizable metal ion and/or the electrolytically-oxidizable metal oxide ion $M^{n+}$, which are electrolytically oxidized again in the vicinity of the anode and the like. The reaction is repeated so that the chemical polymerization is maintained. For example, when the polymerization is started using the electrolytic polymerization solution containing a small amount of ferrous ion ($Fe^{2+}$) previously added, oxidation of the ferrous ion ($Fe^{2+}$) into ferric ion ($Fe^{3+}$) takes place on the anode, in addition to the electrolytic polymerization. The ferric ion ($Fe^{3+}$) oxidizes the monomer in the vicinity thereof so that a chemical polymerization takes place in the electrolytic polymerization solution.

In the process described above, an electrolytically-polymerized electrically-conductive polymer film is formed on the surface of the anode body element 1A by the electrolytic polymerization, and a minute chemically-polymerized electrically-conductive polymer film is moderately formed on the surface of the electrolytically-polymerized electrically-conductive polymer film by the chemical polymerization, so that the electrically-conductive polymer hybrid layer 32 composed of the electrolytically-polymerized electrically-conductive polymer and the chemically-polymerized electrically-conductive polymer mixed therein is formed.

In this process, the content of the electrolytically-oxidizable metal ion and/or the electrolytically-oxidizable metal oxide ion in the electrolytic polymerization solution, as the total molarity, is preferably in the range of $2.5 \times 10^{-5}$ mol/l to $1.0 \times 10^{-4}$ mol/l. If the content of the electrolytically-oxidizable metal ion and/or the electrolytically-oxidizable metal oxide ion in the electrolytic polymerization solution is higher than $1.0 \times 10^{-4}$ mol/l, the content of the electrolytically-polymerized electrically-conductive polymer, which has a lower ESR and can form a stronger film than the chemically-polymerized electrically-conductive polymer, can be reduced so that it can be hard to form a film excellent in mechanical strength and that it can be difficult to achieve the ESR-reducing effect due to a decrease in electrical conductivity. If the content of the metal ion and/or the metal oxide ion is lower than $2.5 \times 10^{-5}$ mol/l, it can be hard to take place sufficient chemical polymerization in the electrolytic polymerization solution, and the electrically-conductive polymer hybrid layer 32 can have a smooth surface, so that it can be difficult to increase the adhesion between the solid electrolyte layer 3 and the first cathode lead layer 4, and thus the ESR-reducing effect can be hard to achieve.

The electrolytic polymerization solution may contain one or more kind of metal ions and metal oxide ions. While any electrolytically-oxidizable metal ions or electrolytically-oxidizable metal oxide ions may be used without particular limitation, metal ions or metal oxide ions that can be readily reversible changed between a low valence state and a high valence state by an oxidation-reduction reaction are preferably used. Examples of such ions include iron (II) ions, nickel (II) ions, ruthenium (II) ions, manganese (II) ions, manganate ions, chromate ions and so on. Among them, in particular, iron (II) ions are preferred. These metal ions or metal oxide ions may be added in the form of various inorganic or organic salt to the electrolytic polymerization solution.

After the solid electrolyte layer 3 is formed as described above, the first cathode lead layer 4 and the second cathode lead layer 5 are sequentially formed on the electrically-conductive polymer hybrid layer 32 of the solid electrolyte layer 3 so that the capacitor element 8 is prepared. Thereafter, the cathode lead frame 21 is connected to the second cathode lead layer 5 of the prepared capacitor element 8, and the anode lead frame 20 is connected to the anode lead 10. The capacitor element 8 is covered with the exterior coating resin 7, while part of each of the cathode lead frame 21 and the anode lead frame 20 is left uncovered. The exposed part of each of the cathode lead frame 21 and the anode lead frame 20 is then bent along the exterior so that the solid electrolytic capacitor of the first embodiment shown in FIG. 1 is produced.

Second Embodiment

Figure 3:
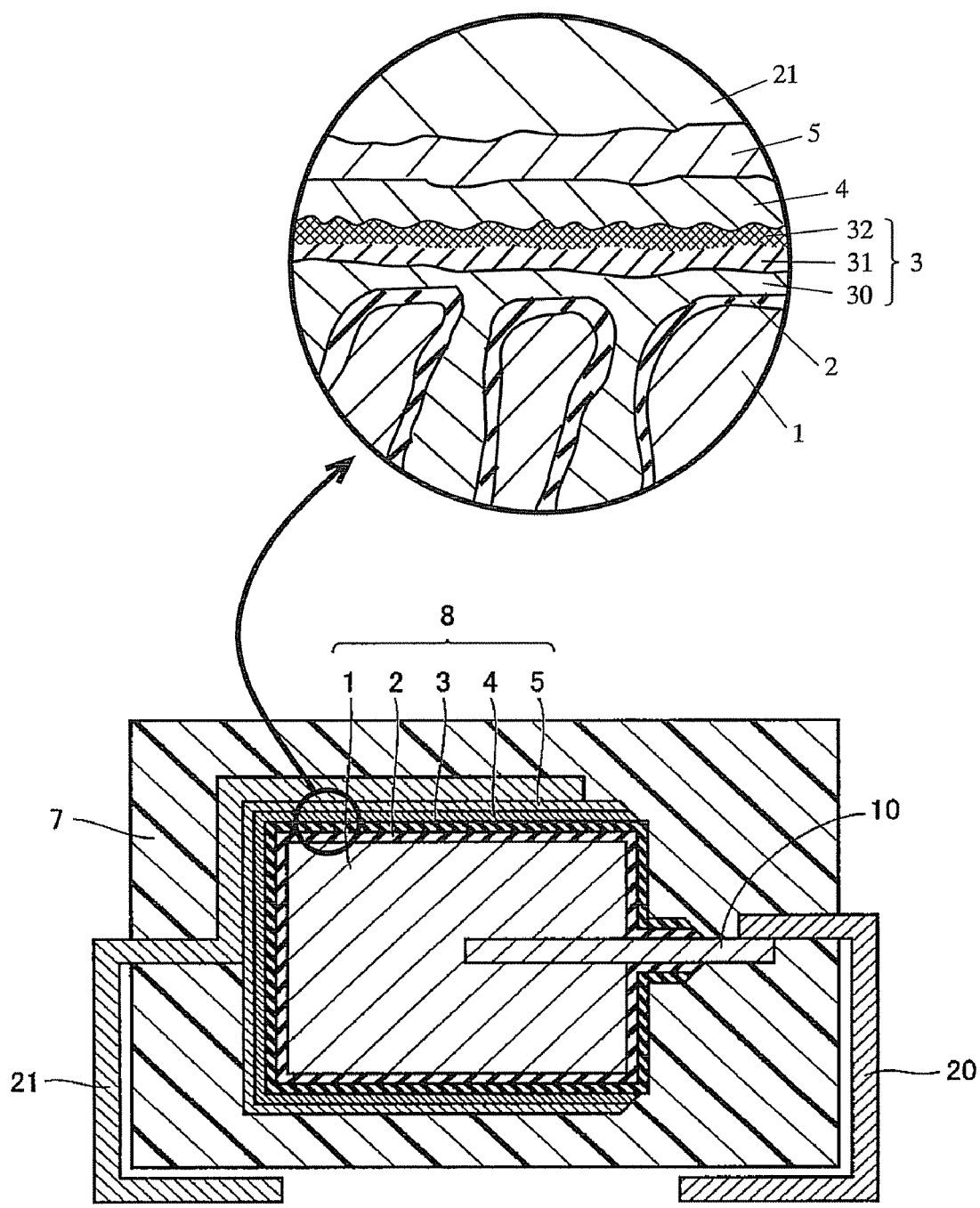
FIG. 3 is a cross-sectional schematic view showing the structure of a solid electrolytic capacitor according to the second embodiment of the invention.

Referring to FIG. 3, a solid electrolytic capacitor of a second embodiment has a solid electrolyte layer 3 that includes: an electrolytically-polymerized electrically-conductive polymer layer 31 containing an electrolytically-polymerized electrically-conductive polymer (a first electrolytically-polymerized electrically-conductive polymer); and an electrically-conductive polymer hybrid layer 32 containing an electrolytically-polymerized electrically-conductive polymer (a second electrolytically-polymerized electrically-conductive polymer) and a chemically-polymerized electrically-conductive polymer. Specifically, the solid electrolyte layer 3 is composed of an electrically-conductive precoat layer 30 formed on a dielectric film 2, the electrolytically-polymerized electrically-conductive polymer layer 31 formed on the electrically-conductive precoat layer 30, and the electrically-conductive polymer hybrid layer 32 that is formed on the electrolytically-polymerized electrically-conductive polymer layer 31 and in contact with a first cathode lead layer 4.

The electrically-conductive polymer hybrid layer 32 is formed by producing a chemical polymerization together with an electrolytic polymerization and has a structure in which a chemically-polymerized electrically-conductive polymer is blended in an electrolytically-polymerized electrically-conductive polymer. Thus, the surface of an electrically-conductive polymer hybrid layer 32 has fine irregularities as compared with the surface of the electrolytically-polymerized electrically-conductive polymer film.

In the solid electrolytic capacitor of the second embodiment, the features other than the above are the same as those of the solid electrolytic capacitor of the first embodiment.

Following is a method for producing the solid electrolytic capacitor of the second embodiment.

First, the anode body 1 made of a valve metal is anodically oxidized so that the dielectric film 2 is formed on the surface of the anode body 1. Thereafter, the electrically-conductive precoat layer 30, such as a chemically polymerized layer formed by a chemical polymerization of a monomer or a manganese dioxide layer formed by thermal decomposition, is formed on the surface of the dielectric film 2.

The electrolytically-polymerized electrically-conductive polymer layer 31 is then formed on the electrically-conductive precoat layer 30, and the electrically-conductive polymer hybrid layer 32 is subsequently formed on the electrolytically-polymerized electrically-conductive polymer layer 31.

Specifically, a method for forming the electrolytically-polymerized electrically-conductive polymer layer 31 includes: first immersing an anode body element 1A provided with the electrically-conductive precoat layer 30 in an electrolytic polymerization solution containing at least a monomer and a supporting electrolyte; then bringing an anode rod from the outside into contact with part of the anode body element 1A or connecting the anode body element 1A to an anode plate placed in the electrolytic polymerization solution; and passing an electric current between the anode body element 1A and the cathode plate placed in the electrolytic polymerization solution to start an electrolytic polymerization so that the electrolytically-polymerized electrically-conductive polymer layer 31 is formed. After the electrolytically-polymerized electrically-conductive polymer layer 31 is sufficiently formed, an electrolytically-oxidizable metal ion and/or an electrolytically-oxidizable metal oxide ion are added to the electrolytic polymerization solution so that the electrically-conductive polymer hybrid layer 32 is sequentially formed on the electrolytically-polymerized electrically-conductive polymer layer 31.

As described in the first embodiment with reference to FIG. 2, an electrolytic polymerization proceeds in the polymerization solution, while the metal ion and/or metal oxide ion are turned into high-valence ions, which act as an oxidizing agent to oxidize the monomer, so that the monomer is polymerized chemically.

In this process, the type and amount of the metal ion and/or metal oxide ion to be added to the electrolytic polymerization solution may be the same as those in the first embodiment.

In the process described above, the electrolytically-polymerized electrically-conductive layer 31 is formed on the surface of the anode body element 1A by the electrolytic polymerization, and then the electrolytic polymerization take place accompanied with the chemical polymerization so that the electrically-conductive polymer hybrid layer 32 including the electrolytically-polymerized electrically-conductive polymer and the chemically-polymerized electrically-conductive polymer blended therein is formed on the electrolytically-polymerized electrically-conductive polymer layer 31.

In this process, the thickness of each of the electrolytically-polymerized electrically-conductive polymer layer 31 and the electrically-conductive polymer hybrid layer 32 is approximately proportional to the polymerization time. The ratio of the thickness of the electrolytically-polymerized electrically-conductive polymer layer 31 to that of the electrically-conductive polymer hybrid layer 32 is preferably in the range of 6:1 to 3:4. In this range, both the electrolytically-polymerized electrically-conductive polymer layer 31 and the electrically-conductive polymer hybrid layer 32 can be formed with a sufficient thickness, and the ESR-reducing effect can be expected. The ratio of the thickness of the electrolytically-polymerized electrically-conductive polymer layer 31 to that of the electrically-conductive polymer hybrid layer 32 is preferably in the range of 6:1 to 3:3.5 for reliable achievement of the ESR-reducing effect, more preferably in the range of 3:2.5 to 3:3.5 for further enhancement of the ESR-reducing effect.

After the solid electrolyte layer 3 is formed as described above, the first cathode lead layer 4 and the second cathode lead layer 5 are sequentially formed on the electrically-conductive polymer hybrid layer 32 of the solid electrolyte layer 3 so that the capacitor element 8 is prepared. Thereafter, the cathode lead frame 21 is connected to the second cathode lead layer 5 of the prepared capacitor element 8, and the anode lead frame 20 is connected to the anode lead 10. The capacitor element 8 is covered with the exterior coating resin 7, while part of each of the cathode lead frame 21 and the anode lead frame 20 is left uncovered. The exposed part of each of the cathode lead frame 21 and the anode lead frame 20 is then bent along the exterior so that the solid electrolytic capacitor of the second embodiment shown in FIG. 3 is produced.

Figure 4:
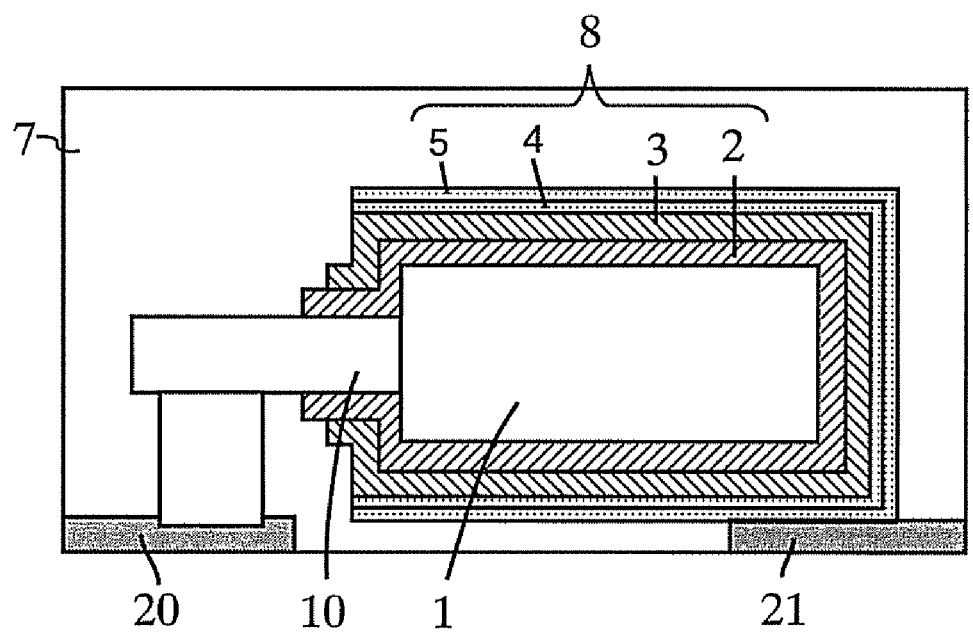
FIG. 4 is a cross-sectional schematic view showing the structure of a solid electrolytic capacitor according to other embodiment of the invention.

The solid electrolytic capacitor according to the invention is not limited to the embodiments described above, and various applications or modifications are possible within the literal or equivalent scope of the claims. For example, the solid electrolytic capacitor of the invention may have the structure shown in FIG. 4. A plurality of capacitor elements each having the solid electrolyte layer 3 according to the invention may also be prepared and stacked.

EXAMPLES

First Example

Example 1-1

A dielectric film 2 was formed on the surface of a sintered body (anode body) 1 having an anode lead 10, and an electrically-conductive precoat layer 30 was formed on the dielectric film 2 so that an anode body element 1A was prepared. The anode body element 1A was immersed in an electrolytic polymerization solution (10 L) containing pyrrole (0.018 mol/l) as a monomer, an alkylnaphthalenesulfonate (0.004 mol/l) as a supporting electrolyte, and ferrous sulfate (in such an amount that $2.5 \times 10^{-5}$ mol/l of ferrous ions were produced to be electrolytically oxidized). An electric current was passed between the anode body element 1A and a cathode plate placed in the electrolytic polymerization solution so that an electrically-conductive polymer hybrid layer 32 composed of an electrolytically-polymerized electrically-conductive polymer and a chemically-polymerized electrically-conductive polymer being mixed with each other was formed on the electrically-conductive precoat layer 30 of the anode body element 1A. Thus, a solid electrolyte layer 3 was formed.

A carbon layer (a first cathode lead layer) 4 and a silver paste layer (a second cathode lead layer) 5 were formed on the solid electrolyte layer 3 so that a capacitor element 8 was prepared. Thereafter, a cathode lead frame 21 was connected to the silver paste layer 5 of the capacitor element 8, and an anode lead frame 20 was connected to the anode lead 10. The capacitor element 8 was then covered with an exterior coating resin 7, except for part of each of the anode lead frame 20 and the cathode lead frame 21. The exposed part of each of the lead frames 20 and 21 was bent along the exterior so that a solid electrolytic capacitor was produced.

Example 1-2

A solid electrolytic capacitor was prepared using the process of Example 1-1, except that ferrous sulfate was used in such an amount that $5.0 \times 10^{-5}$ mol/l of ferrous ions were produced.

Example 1-3

A solid electrolytic capacitor was prepared using the process of Example 1-1, except that ferrous sulfate was used in such an amount that $7.5 \times 10^{-5}$ mol/l of ferrous ions were produced.

Example 1-4

A solid electrolytic capacitor was prepared using the process of Example 1-1, except that ferrous sulfate was used in such an amount that $1.0 \times 10^{-4}$ mol/l of ferrous ions were produced.

Comparative Example 1-1

A solid electrolytic capacitor was prepared using the process of Example 1-1, except that no ferrous sulfate was added. In this case, only an electrolytically-polymerized electrically-conductive polymer layer was formed as the solid electrolyte layer on the electrically-conductive precoat layer 30 by the electrolytic polymerization.

All the examples and the comparative example were subjected to ESR measurement. The results are shown in Table 1 and FIG. 5.

TABLE 1

| | Example 1-1 | Example 1-2 | Example 1-3 | Example 1-4 | Comparative Example 1-1 |
|---|---|---|---|---|---|
| ESR (mΩ) | 7.04 | 6.91 | 6.88 | 7.01 | 7.69 |

Figure 5:
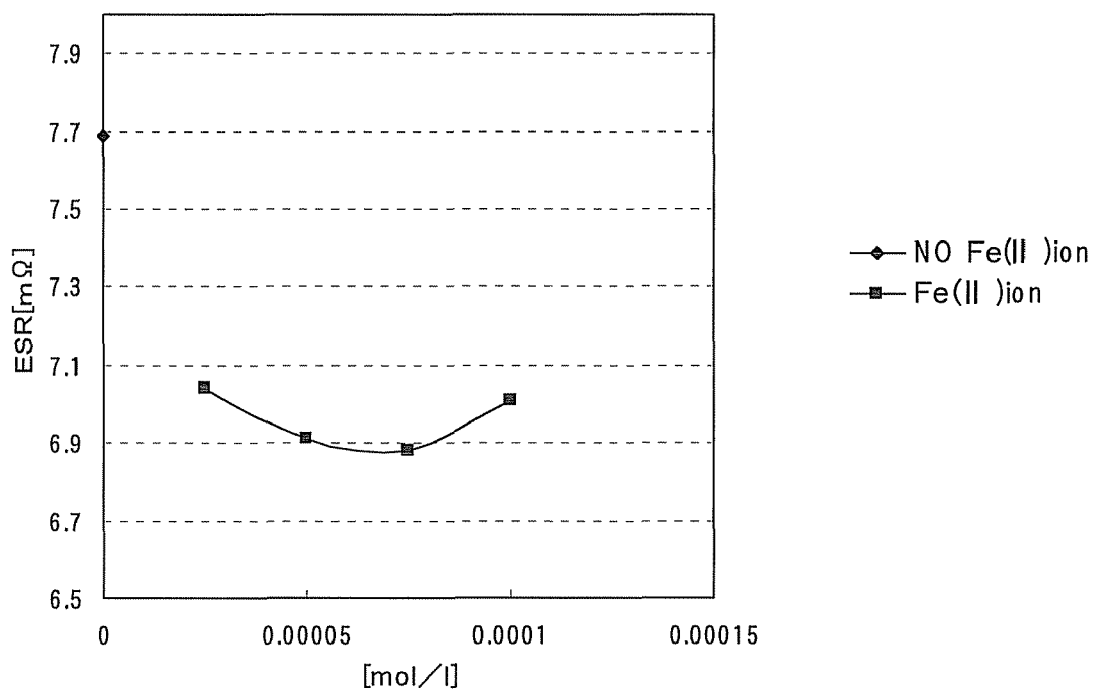
FIG. 5 is a graph showing the relationship between the content of ferrous ion in an electrolytic polymerization solution and the ESR of a solid electrolytic capacitor produced in a first example of the invention.

Table 1 and FIG. 5 indicate that the solid electrolytic capacitor of each of Examples 1-1 to 1-4 produced through the process including the polymerization in a ferrous ion-containing electrolytic polymerization solution shows lower ESR, than the solid electrolytic capacitor of Comparative Example 1-1 produced through the process including the polymerization in a ferrous ion-free electrolytic polymerization solution.

It is concluded that the electrically-conductive polymer hybrid layer 32 includes an electrolytically-polymerized electrically-conductive polymer and a chemically-polymerized electrically-conductive polymer blended therein and thus has fine irregularities on the surface, as compared with the electrolytically-polymerized electrically-conductive polymer layer alone, so that the electrically-conductive polymer hybrid layer 32 has an increased surface area and that the adhesion between the electrically-conductive polymer hybrid layer 32 and the carbon layer 4 formed thereon is increased, and as a result, the contact area between the solid electrolyte layer 3 and the carbon layer 4 is increased so that the current collectivity is increased and that ESR of the solid electrolytic capacitor is reduced.

Second Example

Example 2-1

A dielectric film 2 was formed on the surface of a sintered body (anode body) 1 having an anode lead 10, and an electrically-conductive precoat layer 30 was formed on the dielectric film 2 so that an anode body element 1A was prepared. The anode body element 1A was immersed in an electrolytic polymerization solution containing pyrrole (0.018 mol/l) as a monomer and an alkylnaphthalenesulfonate (0.004 mol/l) as a supporting electrolyte. An electric current was then passed for 6 hours so that an electrolytically-polymerized electrically-conductive polymer layer 31 was formed. Subsequently, ferrous sulfate as a metal compound for producing electrolytically-oxidizable bivalent metal ion (in such an amount that $5.0 \times 10^{-5}$ mol/l of ferrous ions were produced to be electrolytically oxidized) was further added to the electrolytic polymerization solution, and an electric current was passed for 1 hour. Thus, an electrically-conductive polymer hybrid layer 32 was formed on the electrolytically-polymerized electrically-conductive polymer layer 31, so that a solid electrolyte layer 3 was formed.

A carbon layer (a first cathode lead layer) 4 and a silver paste layer (a second cathode lead layer) 5 were formed on the solid electrolyte layer 3 so that a capacitor element 8 was prepared. Thereafter, a cathode lead frame 21 was connected to the silver paste layer 5 of the capacitor element 8, and an anode lead frame 20 was connected to the anode lead 10. The capacitor element 8 was covered with an exterior coating resin 7, except for part of each of the anode lead frame 20 and the cathode lead frame 21. The exposed part of each of the lead frames 20 and 21 was bent along the exterior so that a solid electrolytic capacitor was produced.

Example 2-2

A solid electrolytic capacitor was prepared using the process of Example 2-1, except that the electric current was passed for 2 hours after the addition of the ferrous sulfate.

Example 2-3

A solid electrolytic capacitor was prepared using the process of Example 2-1, except that the electric current was passed for 2.5 hours after the addition of the ferrous sulfate.

Example 2-4

A solid electrolytic capacitor was prepared using the process of Example 2-1, except that the electric current was passed for 3 hours before the addition of the ferrous sulfate and the electric current was passed for 2 hours after the addition of the ferrous sulfate.

Example 2-5

A solid electrolytic capacitor was prepared using the process of Example 2-4, except that the electric current was passed for 2.5 hours after the addition of the ferrous sulfate.

Example 2-6

A solid electrolytic capacitor was prepared using the process of Example 2-4, except that the electric current was passed for 3 hours after the addition of the ferrous sulfate.

Example 2-7

A solid electrolytic capacitor was prepared using the process of Example 2-4, except that the electric current was passed for 3.5 hours after the addition of the ferrous sulfate.

Comparative Example 2-1

A solid electrolytic capacitor was prepared using the process of Example 2-1, except that no ferrous sulfate was added and that an electric current was passed for 6 hours. In this case, only an electrolytically-polymerized electrically-conductive polymer layer was formed as the solid electrolyte layer on the electrically-conductive precoat layer 30 by the electrolytic polymerization.

All the examples and the comparative example were subjected to ESR measurement. The results are shown in Table 2.

TABLE 2

| | Example 2-1 | Example 2-2 | Example 2-3 | Example 2-4 | Example 2-5 | Example 2-6 | Example 2-7 | Comparative Example 2-1 |
|---|---|---|---|---|---|---|---|---|
| ESR (mΩ) | 7.39 | 7.16 | 7.11 | 7.15 | 6.96 | 6.63 | 6.75 | 7.57 |

Table 2 indicates that the solid electrolytic capacitor of each of Examples 2-1 to 2-7 produced through the process including the electrolytic polymerization in a ferrous ion-free electrolytic polymerization solution and the electrolytic polymerization in the electrolytic polymerization solution containing ferrous ions, shows lower ESR than the solid electrolytic capacitor of Comparative Example 2-1 produced through the process only including the electrolytic polymerization in a ferrous ion-free electrolytic polymerization solution.

It is concluded that the electrically-conductive polymer hybrid layer 32 formed on the electrolytically-polymerized electrically-conductive polymer layer 31 with high electrical conductivity includes an electrolytically-polymerized electrically-conductive polymer and a chemically-polymerized electrically-conductive polymer blended therein and thus has fine irregularities on the surface, as compared with the electrolytically-polymerized electrically-conductive polymer layer alone, so that the electrically-conductive polymer hybrid layer 32 has an increased surface area and that the adhesion between the electrically-conductive polymer hybrid layer 32 and the carbon layer 4 formed thereon is increased, and as a result, the contact area between the solid electrolyte layer 3 and the carbon layer 4 is increased so that the current collectivity is increased and that ESR of the solid electrolytic capacitor is reduced.

As described above in detail, according to a first aspect of the invention, there is provided a solid electrolytic capacitor having a solid electrolyte layer, comprising:

the solid electrolyte layer having an electrically-conductive polymer hybrid layer containing an electrolytically-polymerized electrically-conductive polymer and a chemically-polymerized electrically-conductive polymer.

A cathode lead layer is preferably successively formed on the electrically-conductive polymer hybrid layer. The electrically-conductive polymer hybrid layer is preferably successively formed on the electrically-conductive precoat layer containing an electrically-conductive material. The electrically-conductive precoat layer is preferably successively formed on a dielectric film.

According to the above configurations, the electrically-conductive polymer hybrid layer has fine irregularities on its surface and exhibits good adhesion to the cathode lead layer formed thereon. Thus, the contact area and the current collectivity increase so that ESR can be reduced. In addition, the electrically-conductive polymer hybrid layer containing the electrolytically-polymerized electrically-conductive polymer and the chemically-polymerized electrically-conductive polymer does not make the solid electrolyte layer thick, and the electrical conductivity is higher in this case than in the case where a chemically polymerized layer is only formed on an electrolytically polymerized layer. Thus, solid electrolytic capacitors with good ESR characteristics can be achieved, while their size is kept small.

According to the first aspect of the invention, the solid electrolytic capacitor may have a solid electrolyte layer comprising an electrolytically-polymerized electrically-conductive polymer layer containing an electrolytically-polymerized electrically-conductive polymer, and the electrically-conductive polymer hybrid layer.

The electrically-conductive polymer hybrid layer is preferably successively formed on the electrolytically-polymerized electrically-conductive polymer layer. A cathode lead layer is preferably successively formed on the electrically-conductive polymer hybrid layer.

According to the above configurations, the electrically-conductive polymer hybrid layer formed on the electrolytically-polymerized electrically-conductive polymer layer with high conductivity and quality has fine irregularities on its surface and exhibits good adhesion to the cathode lead layer formed thereon. Thus, the contact area and the current collectivity increase so that ESR can be reduced. In addition, the electrically-conductive polymer hybrid layer containing the electrolytically-polymerized electrically-conductive polymer and the chemically-polymerized electrically-conductive polymer does not make the solid electrolyte layer thick, and the electrical conductivity is higher in this case than in the case where a chemically polymerized layer is formed on an electrolytically polymerized layer. Thus, solid electrolytic capacitors with good ESR characteristics can be achieved, while their size is kept small.

According to a second aspect of the invention, there is provided a method for producing a solid electrolytic capacitor having a solid electrolyte layer, wherein the solid electrolyte layer includes an electrically-conductive polymer hybrid layer containing an electrolytically-polymerized electrically-conductive polymer and a chemically-polymerized electrically-conductive polymer, comprising the step of:

forming the electrically-conductive polymer hybrid layer by an electrolytic polymerization in an electrolytic polymerization solution containing an electrolytically-oxidizable metal ion and/or an electrolytically-oxidizable metal oxide ion and a chemical polymerization using an oxidizing agent produced by electrolytic oxidation of the metal ion and/or the metal oxide ion in the electrolytic polymerization solution.

The electrolytically-oxidizable metal ion and the electrolytically-oxidizable metal oxide ion preferably include at least one selected from the group consisting of iron (II) ions, nickel (II) ions, ruthenium (II) ions, manganese (II) ions, manganate ions, and chromate ions.

According to the above configuration, the electrically-conductive polymer hybrid layer is formed by the electrolytic polymerization accompanied with the chemical polymerization. Thus, a solid electrolytic capacitor with good ESR characteristic can be produced by a simple method with no increase in the number of processes. In addition, an oxidizing agent is produced in the vicinity of the surface of the polymer film, when the chemical polymerization takes place in the electrolytic polymerization solution. Thus, the resulting electrically-conductive polymer hybrid layer has low contact resistance between the electrolytically-polymerized electrically-conductive polymer and the chemically-polymerized electrically-conductive polymer, and thus has good electrical conductivity, which contributes to a reduction in ESR.

According to a third aspect of the invention, there is provided a method for producing a solid electrolytic capacitor having a solid electrolyte layer, wherein the solid electrolyte layer includes an electrolytically-polymerized electrically-conductive polymer containing electrolytically-polymerized electrically-conductive polymer, and an electrically-conductive polymer hybrid layer containing an electrolytically-polymerized electrically-conductive polymer and a chemically-polymerized electrically-conductive polymer, comprising the steps of:

forming the electrolytically-polymerized electrically-conductive layer by an electrolytic polymerization in an electrolytic polymerization solution containing at least a monomer and a dopant;

adding a metal compound that produces an electrolytically-oxidizable metal ion and/or an electrolytically-oxidizable metal oxide ion to the electrolytic polymerization solution; and forming the electrically-conductive polymer hybrid layer by an electrolytic polymerization in the electrolytic polymerization solution containing the metal ion and/or the metal oxide ion and a chemical polymerization using an oxidizing agent produced by electrolytic oxidation of the metal ion and/or the metal oxide ion in the electrolytic polymerization solution.

The electrolytically-oxidizable metal ion and the electrolytically-oxidizable metal oxide ion preferably include at least one selected from the group consisting of iron (II) ions, nickel (II) ions, ruthenium (II) ions, manganese (II) ions, manganate ions, and chromate ions.

According to the above configurations, the electrically-conductive polymer hybrid layer is formed by the electrolytic polymerization accompanied with the chemical polymerization. Thus, a solid electrolytic capacitor with good ESR characteristic can be produced by a simple method with no increase in the number of processes. In addition, an oxidizing agent is produced in the vicinity of the surface of the polymer film, when the chemical polymerization occurs in the electrolytic polymerization solution. Thus, the resulting electrically-conductive polymer hybrid layer has low contact resistance between the electrolytically-polymerized electrically-conductive polymer and the chemically-polymerized electrically-conductive polymer, and thus has good electrical conductivity, which contributes to a reduction in ESR.

The present application claims priorities based on a Japanese Patent Application No. 2007-50442 filed on Feb. 28, 2007, and a Japanese Patent Application No. 2007-74270 filed on Mar. 22, 2007, the contents of which are hereby incorporated by reference in their entirely.

Although the present invention has been described in detail, the foregoing descriptions are merely exemplary at all aspects, and do not limit the present invention thereto. It should be understood that an enormous number of unillustrated modifications may be assumed without departing from the scope of the present invention.

What is claimed is:

1. A solid electrolytic capacitor having a solid electrolyte layer, comprising:
    the solid electrolyte layer having an electrically-conductive polymer hybrid layer containing an electrolytically-polymerized electrically-conductive polymer and a chemically-polymerized electrically-conductive polymer, and an electrically-conductive precoat layer containing an electrically-conductive material and the electrically-conductive polymer hybrid layer, wherein the electrically-conductive polymer hybrid layer is formed on the electrically-conductive pre coat layer.

2. The solid electrolytic capacitor according to claim 1, wherein a cathode lead layer is formed on the electrically-conductive polymer hybrid layer.

3. The solid electrolytic capacitor according to claim 1, wherein the electrically-conductive precoat layer is formed on a dielectric film.

4. A method for producing a solid electrolytic capacitor having a solid electrolyte layer, wherein
    the solid electrolyte layer includes an electrically-conductive polymer hybrid layer containing an electrolytically-polymerized electrically-conductive polymer and a chemically-polymerized electrically-conductive polymer, comprising the step of:
    forming the electrically-conductive polymer hybrid layer by an electrolytic polymerization in an electrolytic polymerization solution containing an electrolytically-oxidizable metal ion and/or an electrolytically-oxidizable metal oxide ion and a chemical polymerization using an oxidizing agent produced by electrolytic oxidation of the metal ion and/or the metal oxide ion in the electrolytic polymerization solution.

5. The method for producing a solid electrolytic capacitor according to claim 4, wherein the electrolytically-oxidizable metal ion and the electrolytically-oxidizable metal oxide ion contain at least one selected from the group consisting of iron (II) ions, nickel (II) ions, ruthenium (II) ions, manganese (II) ions, manganate ions, and chromate ions.

* * * * *